G. AGOLINI.
RECORDING MERCURY BAROMETER.
APPLICATION FILED SEPT. 25, 1911.
1,068,726.
Patented July 29, 1913.
5 SHEETS—SHEET 2.
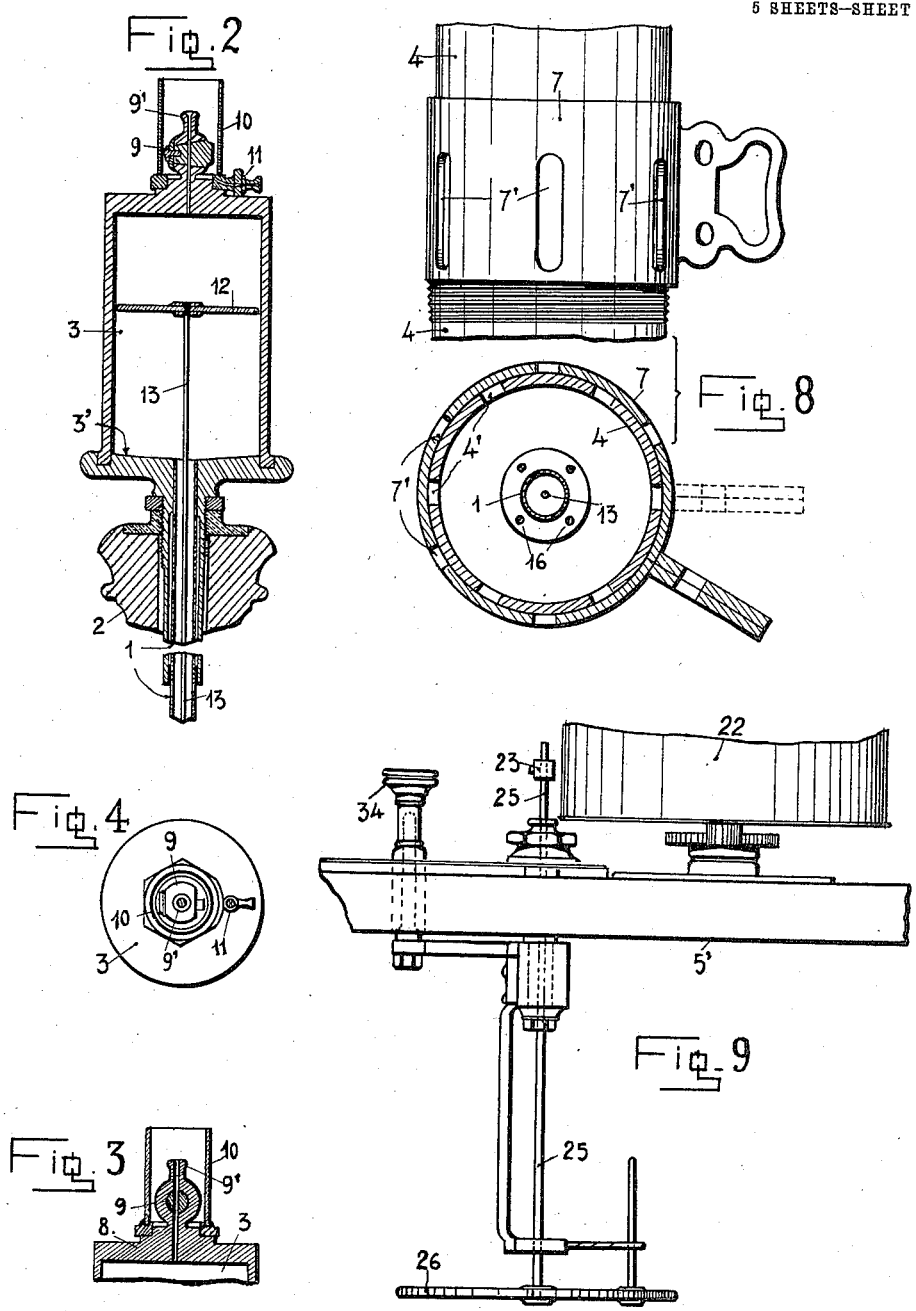

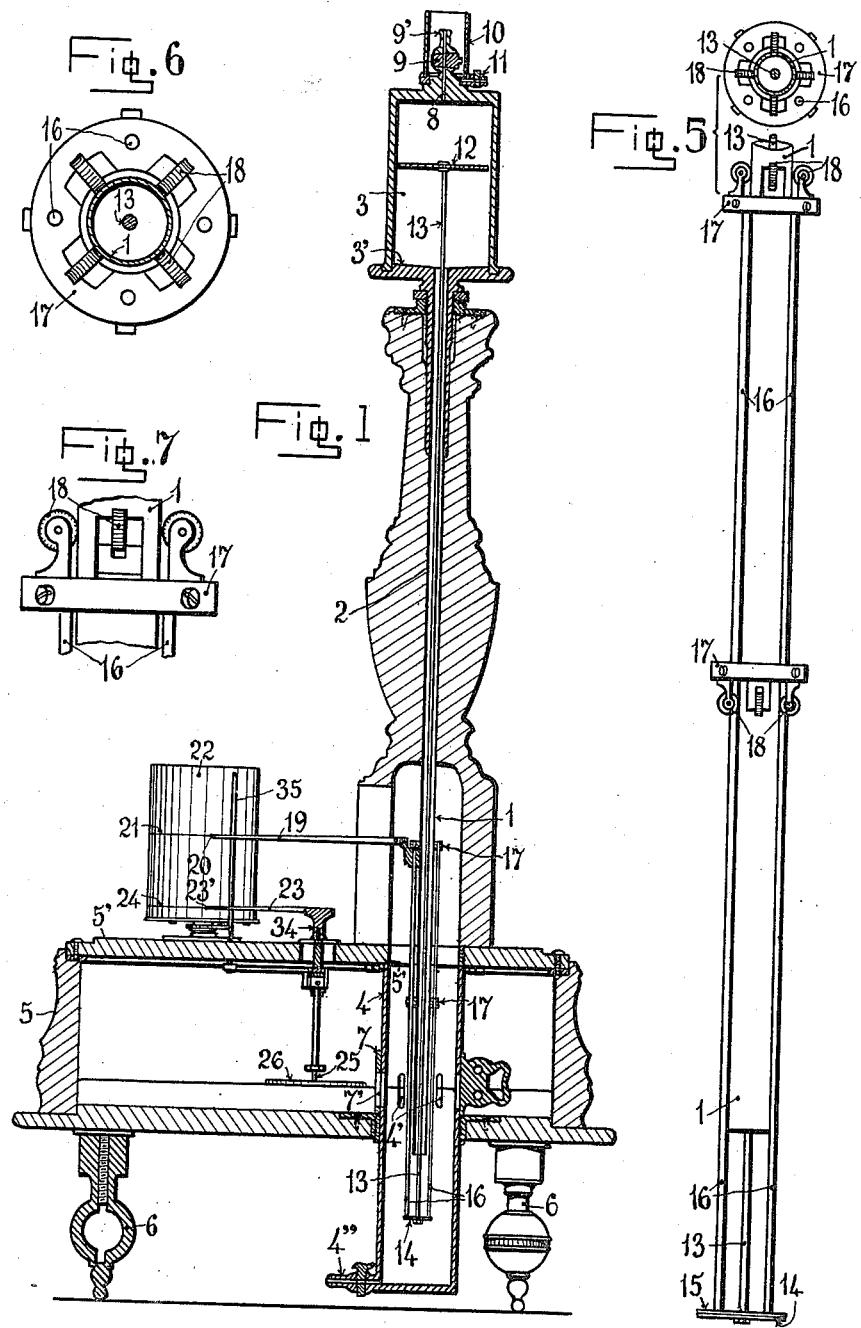

G. AGOLINI.
RECORDING MERCURY BAROMETER.
APPLICATION FILED SEPT. 25, 1911.
1,068,726.
Patented July 29, 1913.
5 SHEETS—SHEET 3.
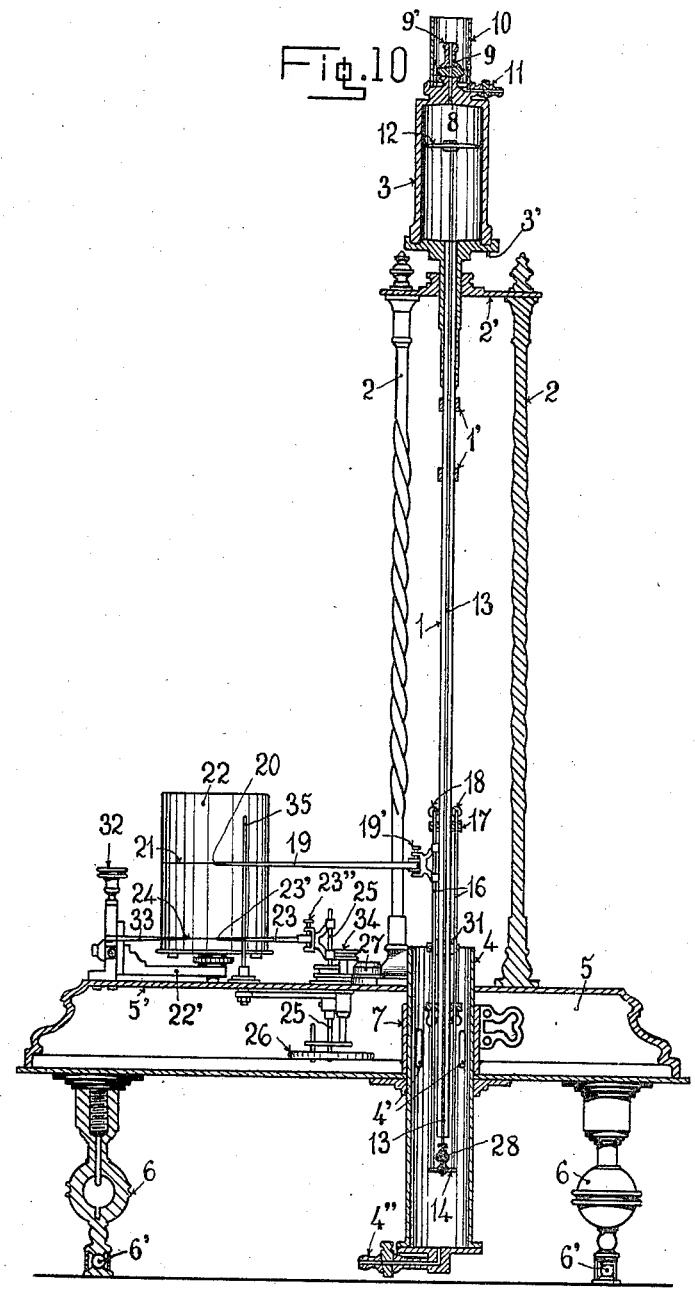

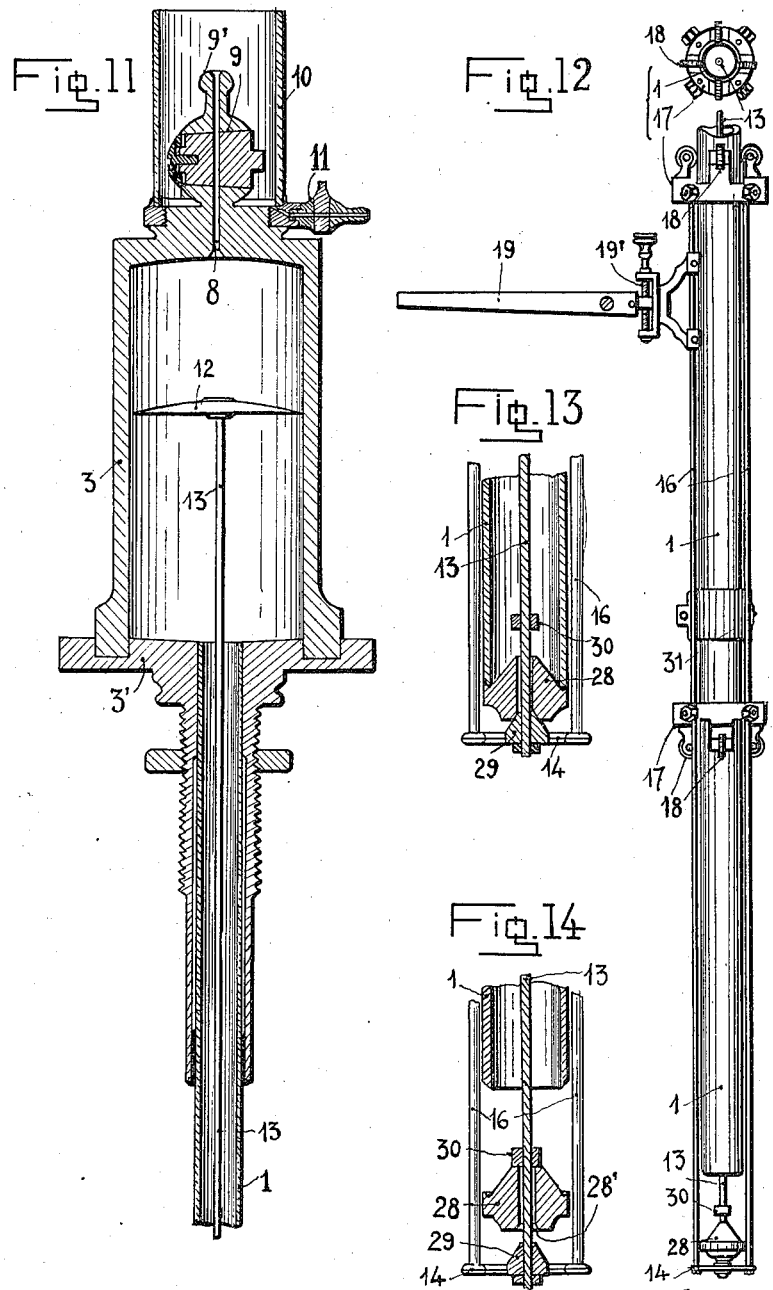

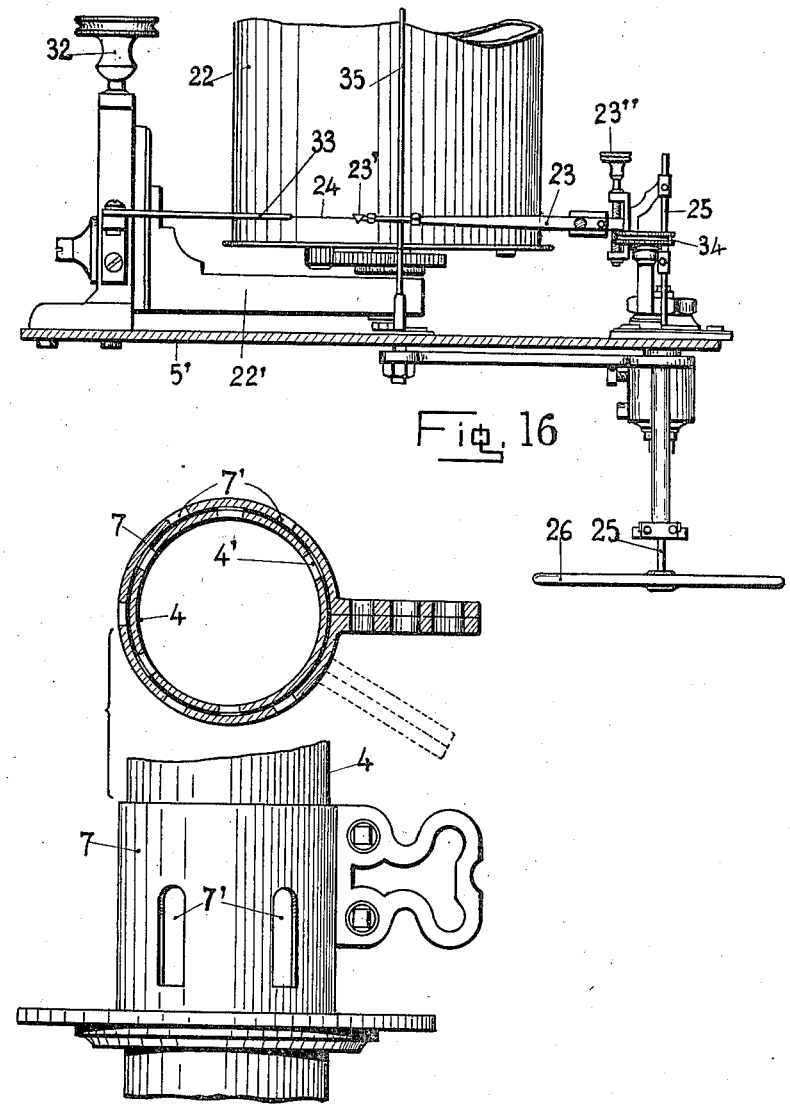

UNITED STATES PATENT OFFICE.

GIUSEPPE AGOLINI, OF TURIN, ITALY.

RECORDING MERCURY-BAROMETER.

1,068,726.  Specification of Letters Patent.  Patented July 29, 1913.

Application filed September 25, 1911. Serial No. 651,159.

*To all whom it may concern:*

Be it known that I, GIUSEPPE AGOLINI, a subject of the King of Italy, residing at Turin, Italy, have invented certain new and useful Improvements in Recording Mercury-Barometers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide an improved recording mercury barometer in which the variations of level of the barometric column are recorded in the form of a continuous diagram on a sheet of paper wound on a drum, to which uniform rotation is imparted by means of an ordinary clock mechanism.

The recording mechanism of the improved mercury barometer comprises a float floating at the surface of the mercury column, *i. e.*, inside the barometer chamber (Torricellian chamber). This float is attached to a rigid rod extending through the mercury column and connected at its lower end to transmitting device situated outside the barometer tube. To this device is connected the stylus for drawing the diagram on the recording drum.

Some forms of execution of a recording barometer according to this invention are illustrated by way of example in the accompanying drawings, in which:

Figure 1 is a vertical section of the general arrangement of a first form of construction of the barometer; Fig. 2 is a vertical section on a larger scale of the barometer chamber alone; Fig. 3 is a vertical section at right angles to Fig. 2 of the upper part only of the barometer chamber; Fig. 4 is a plan of the barometer chamber; Fig. 5 is an elevation on a larger scale of the lower part of the barometer tube. Figs. 6, 7, 8 and 9 illustrate details. Fig. 10 is a vertical section of the general arrangement of a second slightly modified form of the same barometer. Fig. 11 is a vertical section of the barometer chamber alone on a larger scale. Fig. 12 is an elevation of the lower part of the barometer tube also on a larger scale. Figs. 13 to 15 are details. Fig. 16 is a detail view of the recording drum.

One form of recording barometer constructed in accordance with this invention, and illustrated in Figs. 1 to 9, comprises a barometer tube 1, preferably of steel or iron fixed to the upright 2. This tube 1 communicates at its upper end with the barometer chamber 3 (Torricellian chamber) which is likewise made of iron or steel and consists preferably of a bottom 3' having an annular mortise in which engages the cylindrical chamber 3 which is fixed to the corresponding annular groove of the bottom 3' by means of a cement having a melting point of about 80° C., for the purpose of enabling the barometer chamber to be removed for cleaning its interior. The tube 1 is immersed at its lower end into a well or tube 4 provided with a discharge cock 4''. This well 4 communicates normally with a basin 5 (constituting the base of the apparatus and provided with screw feet 6 for supporting and levelling the apparatus) through slots 4' formed in the side of the well 4 and through corresponding slots 7' formed in an obturating device 7 having the form of a ring capable of turning with slight friction on the outside of the tube 4. This communication may, however, be interrupted temporarily by turning the ring 7 as shown in the details Fig. 8, in such a manner as to close the slots 4' by means of the full portions of the ring 7. The barometer chamber 3 may be placed in communication with the atmosphere at its upper end by means of a hole 8 and a cock 9, inclosed in a cylindrical vessel 10, preferably of glass, which extends up beyond the outlet 9' of the cock 9, and is removably mounted on the upper end of the chamber 3. The vessel 10 is provided with a discharge cock 11. Inside the barometer chamber 3 is a plate 12 of suitable material, (for instance ebonite) which, as hereinafter described, floats on the surface of the mercury column and consequently follows the variations of level of this column inside the chamber 3. At the center of this plate 12 is fixed a rod 13 preferably of steel, extending vertically down in the axis of the barometer tube 1. Its lower end projecting from the tube 1 terminates in a plate 14 provided with a packing 15 preferably of caoutchouc. For the purpose of guiding the sliding apparatus which comprises the plate 12 and its rod 13 during its vertical movements, the plate 14 is provided with a certain number of bars 16 (four are employed in the example) which extend vertically up outside the tube 1 and are connected together by means of two rings 17, preferably of aluminium, encircling the tube 1. These rings are suitably spaced apart and are provided all round with a certain number of rollers 18 bearing against the outer surface of the tube 1. One of these rings is shown in detail in Figs. 6 and 7, in elevation and plan respectively. Owing to this method of suspension and guidance the sliding apparatus does not encounter any appreciable resistance to its movements.

To one of the bars 16 of the sliding apparatus (said bars having a suitable length for passing entirely out of the well 4 and for passing beyond the top of the cover 5' of the basin 5) is rigidly connected a horizontal arm 19 provided at its end with a stylus 20 for drawing the diagram 21 of pressures on a sheet of paper wound on the drum 22 which is continuously rotated by means of an ordinary clockwork. The position as to height of the arm 19 along the bar 16 to which it is fixed is such that the diagram 21 drawn by the stylus will be situated about mid-way up on the drum 22, when the outer barometric pressure is normal. Another horizontal arm 23 provided at its end with a stylus 23' for drawing a line 24 on the drum 22 is connected by means of a rod 25 capable of vertical motion to a plate 26 which acts as a float floating on the surface of the mercury contained in the basin 5 (shown in detail in Fig. 9). By this means the line 24 drawn by the stylus 23' indicates the level of the mercury in the basin 5 and thus constitutes the base line of the diagram of pressures 21 drawn by the stylus 20.

It is to be noted that any suitable material may be employed in the construction of the various parts of the apparatus. For the parts intended to come in contact with mercury recourse must naturally be had to materials which are unaffected by mercury such as glass, wood, ebonite, etc., and among metals, iron, steel, etc. The selection of one or the other of these materials will depend naturally on the shape and nature of each part of the construction. As regards the dimensions of the barometer there is no limit from a constructional point of view with the exception of the distance—about 76 cm. (height of the barometric column)—between the level of the mercury in the basin 5 and that of the mercury in the chamber 3, in which the mercury should stand at about half way up when the atmospheric pressure is normal. It will, however, be well to make the proportion between the cross sections of the chamber 3 and that of the basin 5 very high for instance 1:100, with the object of rendering inappreciable the variations of level of the mercury in the basin 5 consequent on the variations of level of the mercury in the chamber 3. With a ratio of 1:100 the variations of level in the basin 5 are entirely inappreciable, so that the base line 24 of the resulting diagram will be a straight line.

The mercury is introduced into the barometer as follows: First, the lower exit of the tube 1 is closed by raising the sliding apparatus until the caoutchouc packing 15 of its plate 14 abuts against the lower end of the tube 1. Then the suction pipe of a pump is applied to the outlet 9' of the previously opened cock 9, for the purpose of producing the highest possible vacuum in the interior of the parts 1 and 3. The slots 4' of the part 4 are then closed by moving the ring 7 as shown in Fig. 8, and the well 4 is filled with mercury. Then the lower end of the tube 1 is opened slowly by slightly depressing the sliding apparatus and this causes the mercury to rise in the tube 1. By continuing the operation of the pump and keeping the well 4 always full of mercury, this mercury is caused to rise slowly above the plug of the cock 9. Then the cock is closed and after having removed the suction pipe of the pump, the vessel 10 which had been previously removed is placed again in position and filled with mercury until the cock 9 and its outlet 9' are completely submerged. Then the slots 4' are opened by turning the ring 7, and the mercury contained in the well 4 sinks into the basin 5, thus causing the mercury in the chamber 3 also to sink to its normal level, leaving behind it an absolute vacuum apart from mercury vapors. All entrance of air into the barometer chamber 3 through the cock 9 is prevented by the fact that the cock is submerged by the mercury contained in the vessel 10.

From the foregoing it will be easy to understand the operation of the apparatus. It must first be noted that owing to the difference in the specific gravities of the mercury and the metal parts constituting the sliding apparatus, the latter is subjected to an upward thrust. The construction of this sliding apparatus is such that the weight of its parts which are not submerged in the mercury, such as the upper parts of the bars 16, the rings 17, the arm 19, etc., shall be approximately equal to the said upward thrust. The sliding apparatus will therefore be in equilibrium as a whole when the plate 12 bears on the surface of the mercury contained in the chamber 3. Consequently the plate 12 will follow accurately (more by virtue of adhesion than by the action of the weight acting upon it) all the variations of level of the mercury inside the chamber 3.

These variations will be transmitted accurately and in their exact amounts to the stylus 20, which will thus mark the exact diagram of pressures upon the piece of paper that is wound on the drum 22.

The modifications which occur in the slightly modified form of barometer illustrated in Figs. 10 to 16 are substantially as follows: The barometer tube 1 is freely supported by a crosspiece 2' fixed to uprights 2 and is provided with two stops 1' for the attachment of a thermometer. The plate float 12 of the sliding apparatus is made slightly convex at its upper part for the purpose of preventing small particles of mercury finding a lodging thereon. Screw foot 6 are mounted on balls 6', and a circular spirit level 27 is provided on the cover 5' for the purpose of leveling the barometer. The valve for temporarily closing the end of the tube 1, when introducing the mercury in the apparatus, is preferably made in the form shown in Figs. 13 and 14. This valve consists of a plug 28, preferably of rubber, for closing the tube 1 and is threaded on a rod 13 by means of its central hole which has a diameter slightly greater than that of the rod 13. This hole ends at its lower part in a flaring conical portion 28', in which is adapted to engage a conical plug 29, also of rubber, fixed to a cross 14 to which outer bars 16 are attached. The rod 13 is also provided above the plug 28 with a washer 30. After a vacuum has been established in the tube 1, the sliding apparatus is lowered slightly in order to effect the introduction of the mercury. The plug 29 is lowered and the mercury, in passing through the annular space between the rod 13 and the central hole in the plug 28, strikes against the washer 30, which moderates the force of the jet and deflects the mercury toward the inner sides of the tube 1, along which the mercury rises slowly, carrying up with it any particles of rarefied air which may be still adhering to the tube 1. The recording mechanism has also been slightly modified. For instance a retaining part 31 (Fig. 12) is provided for keeping the stylus 20 in contact with the drum 22. Further the arms 19 and 23 connected respectively to the sliding apparatus and to the rod 25 are mounted adjustably as to height by means of adjusting screws 19' and 23' respectively. The position of the drum 22 as to height is further adjustable by means of the adjusting screw 32 acting upon the arm 22' supporting the drum. A datum pointer 33 is fixed in an invariable position on the cover 5' (Figs. 10 and 16). All these slight modifications are for the purpose of facilitating the setting of the barometer and the mounting upon the drum 22 of the sheet of paper on which are drawn horizontal and parallel pressure-indicating lines spaced uniformly apart, for instance at a distance of 1 mm. and vertical parallel and equidistant time lines, and also a horizontal line serving as the base line of the diagram.

At the first mounting of the sheet upon the drum 22 the operation is as follows: The base line of the sheet is made coincident with the pointer 33 by adjusting the height of the drum 22 by means of the screw 32. Then the position of the part 23 as to height is regulated by means of a screw 23'' in such a manner as to cause the stylus 23' to coincide with the base line. Then by means of the part 19' the position at the height of the stylus 20 of the part 19 is adjusted until this stylus coincide with the line of the diagram which corresponds with the pressure indicated by a standard barometer at the time of starting the improved instrument. Then the clockwork of the drum 22 is wound up, and after having brought the time line marked on the sheet of paper corresponding to the hour at which the improved instrument is started, opposite the two styluses 20, 23' the drum is started. Then when it is required to replace a filled up sheet by a fresh sheet, there is no need of again having to obtain the reading of the atmospheric pressure from a standard barometer as above stated, it being sufficient to bring the base line of the diagram opposite the pointer 33 and the corresponding time line opposite the two styluses 20, 23'. It is preferable to employ the intermediate pointer 33 for setting the sheet of paper, rather than the stylus 23, in order to avoid soiling the sheet of paper. In mounting the sheet of paper, it is preferred to move the two styluses 20, 23' away from the paper by shifting by means of a knob 34, the vertical rod 35, which bears simultaneously against the arms 19, 23.

The chief advantages of the improved recording barometer may be summed up as follows: This barometer compared with existing barometers is very accurate, because in it there are eliminated the depression due to capillarity and also the inconstancy of the meniscus formed by the surface of the mercury in the barometer chamber which varies very appreciably in existing barometers according as it is produced by an ascending or a descending movement of the barometric column. In this barometer there is also eliminated the operation of reducing to zero and the operations of carrying the level of the mercury in the basin to a determined height. The improved barometer also eliminates the personal error in reading, whilst it allows of recording all the variations of pressure which are continually taking place in nature.

Having now particularly described and ascertained the nature of my said invention and in what manner the same is to be performed, I declare that what I claim is:—

1. A barometer comprising intercommunicating containers, bodies of mercury therein, one body of small volume as compared with the other and under vacuum, and mechanisms operated by the variations of level of both of said bodies of mercury to indicate varying atmospheric pressure, the mechanism operated by the larger body having an inappreciable movement due to said variations in atmospheric pressure.

2. A barometer comprising two mercury containers of different volume, a barometric tube normally communicating with said containers, the smaller container being maintained under vacuum and the larger container under atmospheric pressure, mechanism for indicating the level of the mercury in the larger container, and mechanism operable by the mercury in the smaller container for indicating the variations of the mercury in the smaller container relatively to the level of the mercury in the larger container.

3. A barometer comprising two mercury containers of different volume, a barometric tube normally communicating with said containers, the smaller container being maintained under vacuum and the larger container under atmospheric pressure, mechanism operable by the mercury in the larger container for indicating the level of the mercury in the latter, and mechanism operable by the mercury in the smaller container for indicating the variations of the mercury in the latter, relatively to the level of the mercury in the larger container.

4. A barometer comprising two mercury containers of different volume, a barometric tube normally communicating with said containers, the smaller container being maintained under vacuum and the larger container under atmospheric pressure, a sliding mechanism on the tube dipping into the mercury of the basin, the weight of said mechanism being substantially equal to the upward thrust exerted thereon by the mercury, a float in the smaller container connected with the slide, an indicator carried by the latter, and an indicator controlled by the mercury in the larger container.

5. A barometer comprising a mercury containing chamber, a mercury containing basin of larger volume than the chamber and having a normally communicating well extending above and below the bottom thereof, a barometric tube communicating with the chamber and well and extending into the latter below the bottom of the basin, means to close communication between the basin and well, and means to temporarily close the lower end of the tube whereby a vacuum may be created in the tube and chamber.

6. A barometer comprising a mercury containing chamber, a mercury containing basin of larger volume than the chamber and having a normally communicating well extending above and below the bottom thereof, a barometric tube communicating with the chamber and well and extending into the latter below the bottom of the basin, means to close communication between the basin and well, means to temporarily close the lower end of the tube whereby a vacuum may be created in the tube and chamber, means to open and close the upper end of the chamber, and means to seal the upper end of the latter.

7. A barometer comprising a mercury containing chamber, a mercury containing basin of larger volume than the chamber and having a normally communicating well extending above and below the bottom thereof, a barometric tube communicating with the chamber and well and extending into the latter below the bottom of the basin, means to close communication between the basin and well, a cock in the top of the chamber, and a mercury seal surrounding the cock.

8. A barometer comprising a mercury containing basin, a well projecting through and extending above and below the latter and having apertures therein near the bottom of the basin, means to close and open the apertures, a chamber above the basin having an exhaust port, a barometric tube projecting into the well and communicating with the chamber, means to close the bottom of the tube, and a valve to open and close said port.

9. A barometer comprising a mercury containing basin, a well projecting through and extending above and below the latter and having apertures therein near the bottom of the basin, means to close and open the apertures, a chamber above the basin having an exhaust port, a barometric tube projecting into the well and communicating with the chamber, means to close the bottom of the tube, a valve to open and close said port, and means to form a liquid seal around said valve.

10. A barometer comprising a mercury containing basin, a well projecting through and extending above and below the basin and provided with apertures near the bottom of the basin, a mercury containing chamber having an exhaust port therein, a barometric tube communicating with the well and chamber, a cock to control the port, a float in the chamber, a rod carried by the float projecting through the tube, a plate on the rod adapted to close the lower end of the tube, and means to close the apertures, for the purpose specified.

11. In a barometer, the combination with a mercury container, a barometric tube communicating therewith, a float in the container, and a rod in the tube carried by the float, of an indicating mechanism comprising rings surrounding the tube, means connecting the rod and rings, and anti-friction guide rollers journaled in the rings engaging the tube.

12. In a barometer, two mercury containers of different volume, a barometric tube adapted to communicate with the containers, a float in one of the containers, a rod extending through the tube and carried by the float, means operated by the rod to indicate the variations of the mercury in the tube, a main plug having a central opening through which the rod projects, said plug adapted to temporarily close the lower end of the tube, a conical plug fixed on the rod below the main plug and adapted to fit into the end of said hole, and a washer fixed on the rod above the main plug, for moderating the force of the mercury passing through said hole.

In testimony that I claim the foregoing as my invention, I have signed my name in the presence of two subscribing witnesses.

GIUSEPPE AGOLINI.

Witnesses:
PIERO GIANOLIO,
FRANCESCO SIMON.

Copies of this patent may be obtained for five cents each, by addressing the "Commissioner of Patents, Washington, D. C."